Patented June 14, 1932

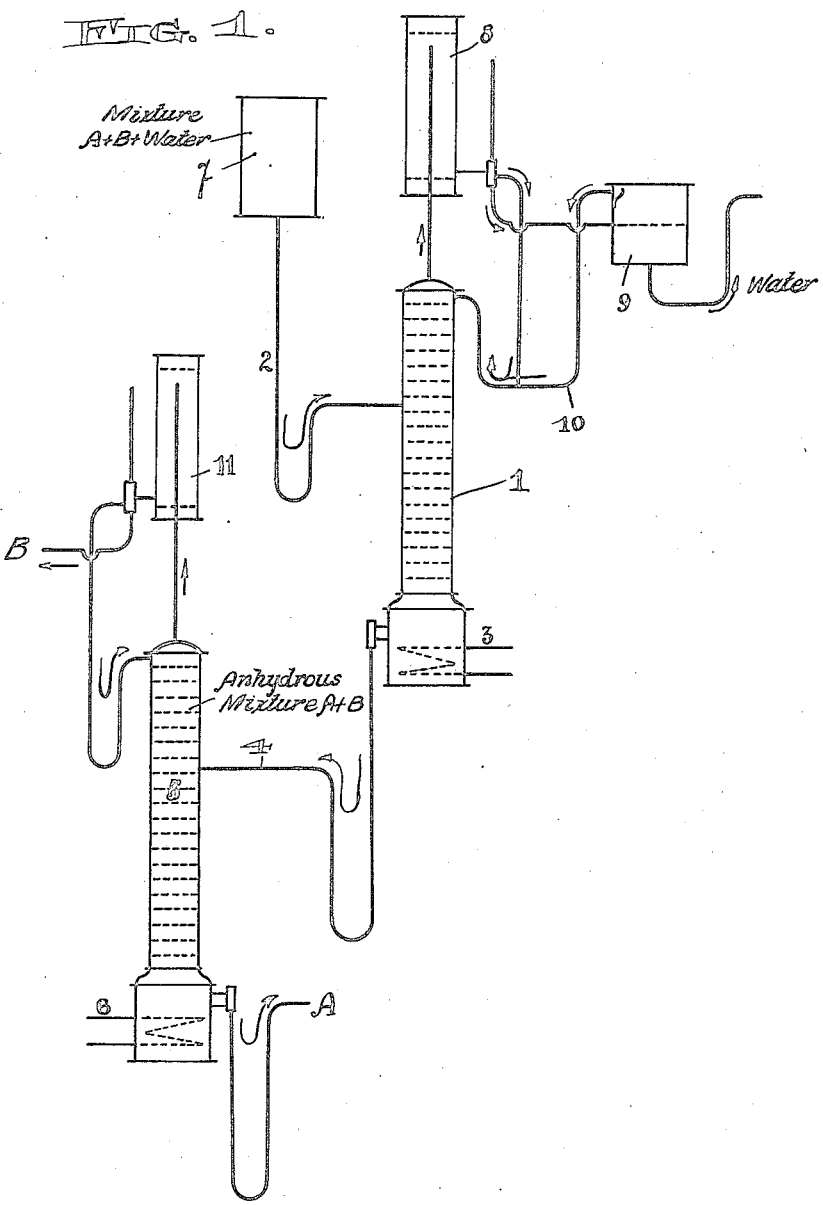

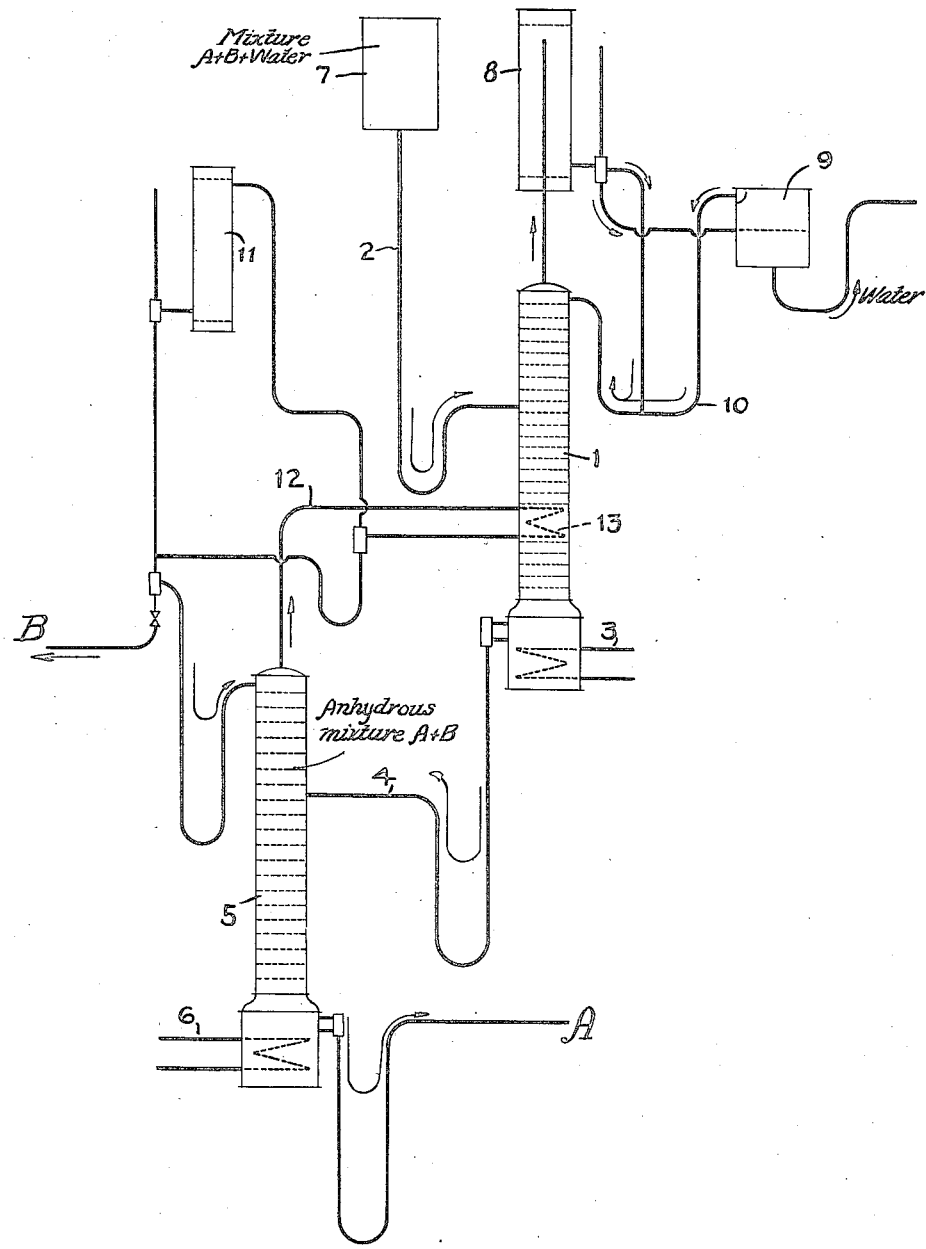

1,862,706

UNITED STATES PATENT OFFICE

ELOI RICARD AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

CONTINUOUS PROCESS FOR SEPARATING ORGANIC LIQUIDS

Application filed November 14, 1928, Serial No. 319,265, and in Belgium February 6, 1928.

It often happens in industrial operations that is is necessary to separate mixtures of organic liquids which have the following characteristics:

An organic liquid A, insoluble or slightly soluble in water is mixed with a more volatile organic liquid B and with a certain quantity of water. Such mixtures are often very difficult to treat by simple distillation, because if it is required to extract the more volatile liquid B, it is found that the azeotropic mixture, formed by the water and the less volatile substance A, generally opposes this separation, even if the boiling points of A and B are widely apart.

The process for separating organic liquids which is the object of the present invention relies in order to obtain a perfect separation of A from B, upon preliminarily dehydrating the mixture by using the ordinary azeotropic method, either by utilizing as a water-carrier—the insoluble liquid A itself, or by utilizing a more volatile auxiliary liquid E (also insoluble in water) as the carrier; the auxiliary liquid can be used indefinitely. The dehydrated mixture of organic liquids obtained in this way can then be readily separated by fractional distillation.

The operation can be carried out at a pressure other than atmospheric.

The liquids A and B may be either pure substances or mixtures.

If the distance between the boiling points of the substance B and of the azeotropic mixture (substance A or E and water) is sufficiently great, the vapours of the substance B which rise in the distillation column can be utilized to heat, totally or partially, the dehydrating column and thereby economize the amount of steam required for heating purposes.

The following examples, to which, however, the invention is not restricted, will enable the plan of the invention to be understood, reference being had to Figs. 1 and 2 illustrating schematically the essential apparatus and a modification thereof by means of which the process is carried out:—

Example 1

It is known that fusel oils obtained as a residue in the distillation of ordinary alcohol contain particularly isoamyl alcohols (liquid A: boiling point 131,8° C.) and isobutyl alcohol (liquid B: boiling point 108° C.) mixed with a certain proportion of water. The presence of water prevents a pure isobutyl alcohol from being obtained by simple distillation, for isoamyl alcohol is carried off with it and forms with the water an azeotropic mixture, boiling at 94,9° C., while the azeotropic mixture, water-isobutyl alcohol, boils at 90,5° C. The small difference of temperature prevents a complete separation of isobutyl alcohol from the isoamyl alcohol.

According to the present invention, the mixture of the two alcohols is first dehydrated by the azeotropic method, using benzene, for example, as the liquid carrier (auxiliary liquid E).

The mixture to be dehydrated contained in the vessel 7 is fed by a tube 2 into a column 1 previously charged with benzene. The lower part of the column 1 is heated by a steam coil 3. The vapours are condensed in the condenser 8 and the resulting liquid is led into a decanting device 9 where it separates into two layers. The upper layer consisting almost exclusively of benzene is continually returned to the upper portion of the column by a pipe 10, while the lower aqueous layer is rejected.

The anhydrous mixture of isobutyl and isoamyl alcohols is run out at the lower portion of the column 1, and is delivered by a tube 4 into a column 5 heated by a steam coil 6 and provided, like the column 1, with a condenser 11. The separation of the two alcohols is then easily effected in this column, since in the absence of water, the difference of the boiling points is raised from 4,4° to 23,8° C.

Example 2

It is required to separate ethylene glycol chlorhydrin from a mixture of water and cyclohexanol. The cyclohexanol, a liquid which is only slightly soluble in water, boiling at 160,6° C. represents the substance A. The ethylene glycol chlorhydrin miscible in water in all proportions, boiling at 128° C., represents the substance B.

In the presence of water, the pure ethylene glycolchlorhydrin cannot be directly extracted by simple distillation, since the cyclohexanol gives with water a mixture having a minimum boiling point of 97,8° C. and containing about 20 per cent of cyclohexanol, which would contaminate the chlorhydrin.

According to the present invention, the ethylene glycol chlorhydrin is separated quantitatively from the cyclohexanol by first dehydrating the mixture. This dehydration can be effected by the cyclohexanol itself, of which the azeotropic mixture contains 80% of water. The apparatus used is identical with that of Example 1. The first column effects the dehydration, the second column separates the ethylene glycol chlorhydrin as a product at the upper portion, cyclohexanol remaining as a product at the bottom (the difference of the boiling points being 32.6° C.).

*Example 3*

To separate in a continuous process acetic acid from a mixture containing acetate of cyclohexanol and a small quantity of water.

The acetate of cyclohexanol, a liquid which is slightly soluble in water, boiling at 175° C. represents the substance A.

The acetic acid, a liquid which is miscible with water in all proportions, boiling at 118° C., represents the substance B.

Pure acetic acid cannot be extracted by direct distillation of the mixture, since cyclohexyl acetate gives with water a mixture of which the minimum boiling point is 98° C., containing 40% of acetate.

According to the present invention, the quantitative separation of the pure acetic acid is obtained by first dehydrating the mixture in an apparatus similar to that used in Example 1.

In the first column the cyclohexyl acetate can be utilized as a liquid carrier of water, but in order to obtain in the decanting device an aqueous layer containing only little acid, it is preferable to take a more volatile water carrier, such as ethyl acetate, for example, which represents the substance E. In column 5, heated indirectly, the acetic acid is obtained as the product at the top and the cyclohexyl acetate as a product at the bottom (difference between the boiling points 47° C.).

The preceding examples are given by way of illustration but do not restrict the invention.

The apparatus used for carrying out the process forming the object of the invention has been sufficiently described in connection with the three preceding examples, so that it is unnecessary to repeat it.

In the said examples the columns 1 and 5 have been supposed to be heated by closed coils 3 and 6, but, as before stated, it is possible, when the difference between the boiling points of the substance B and of the azeotropic mixture (substance A or E and water) is sufficiently great, to utilize the vapours of the substance B which are discharged from the column 5 to heat the column 1 before the said vapours are delivered into the condenser 11.

In Fig. 2 we show the apparatus modified to secure this advantage. The modification consists, essentially, in that the hot vapors issuing from the column 5 through pipe 12 are conducted to a coil 13 in the column 1, the vapor, minus condensate, thence passing to the condenser 11.

What we claim is:—

1. A continuous process for the separation of organic liquids contained in mixture containing an organic liquid A, which is insoluble or slightly soluble in water, an organic liquid B more volatile than A, and water, the said process comprising first dehydrating the said mixture in a continuous manner by distilling the same in a column in the presence of a water entrainer placed once for all in the still, condensing the vapors evolved from the column, decanting the condensate, and returning continuously to the column the layer of entraining liquid, separating continuously in a second column an anhydrous mixture obtained at the lower part of the column of azeotropic dehydration, and collecting the pure liquid B at the top and the liquid A at the base of the said second column.

2. A continuous process for the separation of organic liquids contained in mixtures containing an organic liquid A, which is insoluble or slightly soluble in water, an organic liquid B more volatile than A, and water, the said process comprising first dehydrating the said mixture in a continuous manner by distilling the same in a column in the presence of a water entrainer placed once for all in the still, condensing the vapors evolved from the column, decanting the condensate, and returning continuously to the column the layer of entraining liquid, separating continuously in a second column an anhydrous mixture obtained at the lower part of the column of azeotropic dehydration, operating under any suitable pressure, and collecting the pure liquid B at the top and the liquid A at the base of the said second column.

3. A continuous process for the separation of organic liquids contained in mixtures containing an organic liquid A, which is insoluble or slightly soluble in water, an organic liquid B more volatile than A, and water, the said process comprising first dehydrating the said mixture in a continuous manner by distilling the same in a column in the presence of a water entrainer placed once for all in the still, condensing the vapors evolved from the column, decanting the condensate, and returning continuously to the column the layer of entraining liquid, separating continuously in a second column an anhydrous mixture obtained at the lower part of the column of azeotropic dehydration, operating at atmospheric pressure, and collecting the pure liquid B at the top and the liquid A at the base of the said second column.

4. A continuous process for the separation of organic liquids contained in mixtures containing an organic liquid A, which is insoluble or slightly soluble in water, an organic liquid B more volatile than A, and water, the said process comprising first dehydrating the said mixture in a continuous manner by distilling the same in a column in the presence of a water entrainer placed once for all in the still, condensing the vapors evolved from the column, decanting the condensate, and returning continuously to the column the layer of entraining liquid, utilizing as the liquid carrier of water the liquid A, separating continuously in a second column the anhydrous mixture obtained at the lower part of the azeotropic dehydrating column, operating under any suitable pressure, and collecting the pure liquid B at the top and the liquid A at the base of the said second column.

5. A continuous process for the separation of organic liquids, contained in mixtures containing an organic liquid A, insoluble or slightly soluble in water, an organic liquid B more volatile than A, and water, which process comprises first dehydrating the said mixture in a continuous manner, by distilling the same in a column in the presence of a water entrainer placed once for all in the still, condensing the vapors evolved from the column, decanting the condensate, and returning continuously to the column the layer of entraining liquid, utilizing as water-carrier the liquid A, separating continuously in a second column the anhydrous mixture obtained at the lower part of the column of azeotropic dehydration, operating at atmospheric pressure, and collecting the pure liquid B at the top and the liquid A at the base of the said second column.

6. A continuous process for the separation of organic liquids, contained in mixtures containing an organic liquid A, insoluble or slightly soluble in water, an organic liquid B more volatile than A, and water, the said process comprising first dehydrating the said mixture continuously by distilling the same in a column in the presence of a water entrainer placed once for all in the still, condensing the vapors evolved from the column, decanting the condensate, and returning continuously to the column the layer of entraining liquid, using as the water-carrier an auxiliary liquid E insoluble or slightly soluble in water but more volatile than A, and added in one quantity to the dehydration column, separating continuously in a second column the anhydrous mixture obtained at the lower part of the column of azeotropic dehydration, operating at any suitable pressure, and collecting the pure liquid B at the top and the liquid A at the base of the second column.

7. A continuous process for the separation of organic liquids, contained in mixtures containing an organic liquid A, and water, insoluble or slightly soluble in water, an organic liquid B more volatile than A, the said process comprising first dehydrating the said mixture continuously by distilling the same in a column in the presence of a water entrainer placed once for all in the still, condensing the vapors evolved from the column, decanting the condensate, and returning continuously to the column the layer of entraining liquid, using as the liquid water-carrier an auxiliary liquid E, insoluble or slightly soluble in water, but more volatile than A, and added once for all to the dehydration column, separating continuously in a second column the anhydrous mixture obtained at the lower part of the column of azeotropic dehydration, operating at atmospheric pressure and collecting the pure liquid at the top and the liquid A at the base of the said second column.

In testimony whereof we have signed this specification.

ELOI RICARD.
HENRI MARTIN GUINOT.